United States Patent
Okamoto et al.

[15] 3,656,817
[45] Apr. 18, 1972

[54] ANTISKID BRAKE PRESSURE CONTROL DEVICE FOR HYDRAULIC BRAKING SYSTEMS

[72] Inventors: Tosiaki Okamoto; Masami Inada; Katuki Takayama; Tatsuo Hayashi; Koji Nishida; Naoji Sakakibara; Masao Kamiya, all of Toyota-shi, Japan

[73] Assignee: Aisin Seiki Company Limited, Toyota-shi, Japan

[22] Filed: Oct. 13, 1969

[21] Appl. No.: 865,848

[30] Foreign Application Priority Data

| Oct. 11, 1968 | Japan | 43/74480 |
| Oct. 12, 1968 | Japan | 43/74328 |
| Nov. 9, 1968 | Japan | 43/82662 |
| Nov. 9, 1968 | Japan | 43/82663 |
| Nov. 20, 1968 | Japan | 43/84954 |

[52] U.S. Cl. ..........................303/21 P, 188/181 C, 303/20, 303/21 F
[51] Int. Cl. ..........................B60t 8/12
[58] Field of Search..............188/181; 235/150.2; 246/182; 303/21, 20; 324/162; 340/52 R, 262

[56] References Cited

UNITED STATES PATENTS

| 3,131,975 | 5/1964 | Smith et al. | 303/21 DA |
| 3,362,757 | 1/1968 | Marcheron | 303/21 A |
| 3,415,577 | 12/1968 | Walker | 188/181 A |
| 3,480,335 | 11/1969 | Inada | 303/21 F |
| 3,449,019 | 6/1969 | Walker | 303/21 F |
| 3,515,440 | 6/1970 | Every et al. | 303/21 R |
| 3,520,575 | 7/1970 | Steigernald | 303/21 BB |

Primary Examiner—Milton Buchler
Assistant Examiner—Stephen G. Kunin
Attorney—Sughrue, Rothwell, Mion, Zinn and Macpeak

[57] ABSTRACT

The hydraulic braking circuit between the master cylinder and the wheel cylinder is provided with a valve for interrupting fluid communication therebetween and a movable member for selectively increasing and decreasing the effective volume of a portion of the hydraulic circuit. A sensor is provided for sensing the rotation of at least one of the wheels of the vehicle and delivering an instruction signal when the wheel is subjected to an excess braking beyond a predetermined deceleration of the wheel. The signal from the sensor operates a change-over valve which increases the effective volume of the portion of the hydraulic circuit by actuating the movable member. A detector is provided for detecting maximum deceleration of the wheel during braking and the maximum value of the detected wheel deceleration is preserved in a memory. The detected maximum wheel deceleration and the rate of change of the effective volume of the hydraulic circuit are converted into effective electric signals. An orifice valve controls the rate of effective volume reduction in the hydraulic circuit in response to a comparison of the electric signals.

3 Claims, 17 Drawing Figures

ANTISKID BRAKE PRESSURE CONTROL DEVICE FOR HYDRAULIC BRAKING SYSTEMS

This invention relates to a method for antiskid control of hydraulic brake systems for powered vehicle wheels, and to an apparatus adapted for carrying out same.

In the conventional hydraulic brake pressure control system of the above kind, the control action is carried into effect in such a way that when a sudden and considerable brake application has been made and an impending or a practically invited wheel lock is sensed by a senser, the latter delivers an instruction signal, according to which the hydraulic brake pressure is reduced or even released temporarily so as to bring the thus restarted wheel revolution is brought to a certain stabilized region, whereupon the issuance of said instruction signal is interrupted and a reapplication of brake pressure increase is initiated again, and so on. During the whole braking period, the reduction and increase of the hydraulic pressure are repeated in an alternating way and at a relatively rapid frequency.

It has been experienced that the rapid repetition of the hydraulic brake pressure increase and decrease invites a grave impleasant feeling to the driving personnels, in addition to a considerable ineffective braking energy dissipation as well as a unduly extended braking distance and period, thus this kind of braking operation providing many problems to be solved out.

On the other hand, according to our experiments, highly effective braking operation is realized with the coefficient of adhesion appearing between the rolling vehicle wheels and the road surface on which the wheels are running to be substantially maximum which corresponds to a specific slip ratio range of about 0.15–0.2. Under the locked conditions of the vehicle wheels where the slip ration amounts naturally to unity, the coefficient of adhesion is considerably lower than those above-mentioned highest value.

It is therefore the main object of the invention to propose a highly improved hydraulic brake pressure control technique wherein the coefficient of adhesion is taken into account in such a way that the effective application of hydraulic brake pressure is made within a high range of the coefficient of adhesion substantially corresponding to the slip ratio ranging substantially between 0.15–0.2.

A further object is to propose an improved hydraulic brake pressure control technique of the above kind capable of braking a running vehicle with a shortest possible braking period in an emergency.

These and further objects, features and advantages of the invention will appear more concretely as the description proceeds.

Now referring to the accompanying drawings, especially FIGS. 1–2 thereof, the first embodiment of the invention will be described more in detail.

Figure 1:
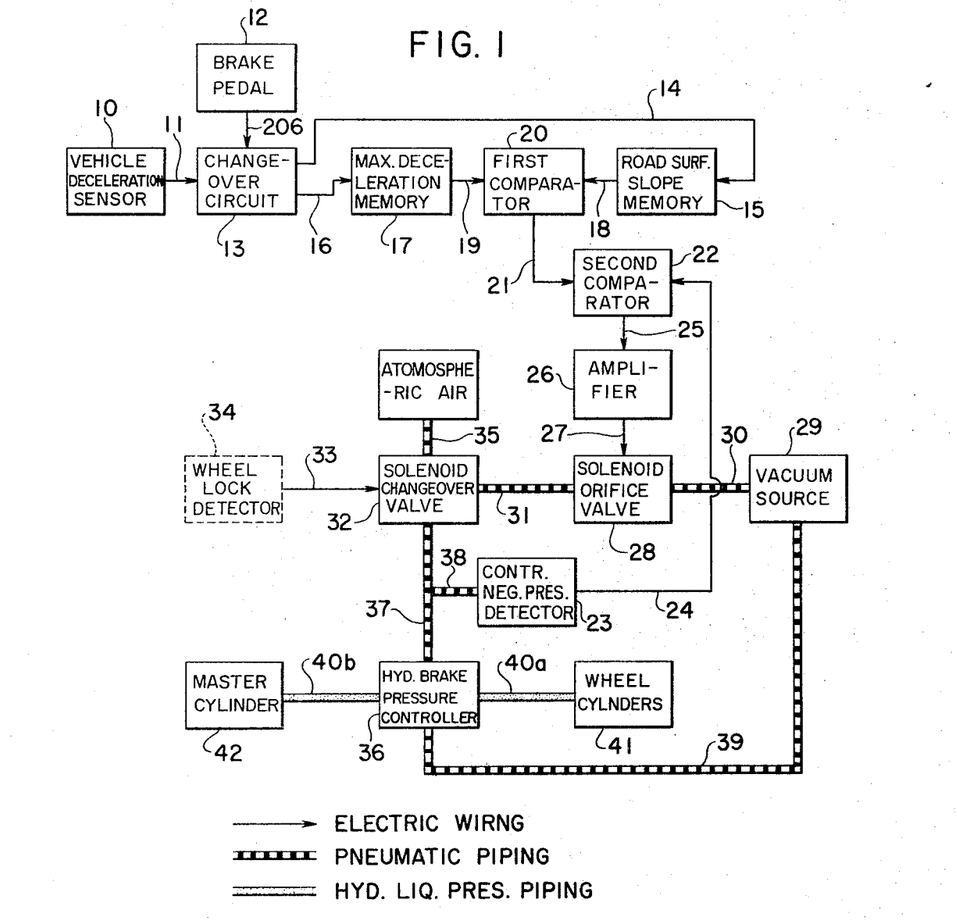
FIG. 1 is a block diagram showing a general arrangement of a brake system embodying the hydraulic brake pressure control device in the form of a first embodiment of the present invention.

First, referring to FIG. 1, the general arrangement of the device adapted for carrying out the method according to this invention is explained.

In FIG. 1, the numeral 10 denotes a vehicle deceleration sensor which is fixedly attached to an automotive vehicle, not shown, preferably in the neighborhood of its center of gravity, although not specifically shown. This sensor is so designed and arranged to sense occasional acceleration or deceleration of the vehicle when the latter is accelerated or braked; or an apparent acceleration or deceleration to which the vehicle is subjected to when it is running on an inclined road or the like surface.

The output of the sensor 10 which is in the form of an electrical signal is fed through conductor 11 to a change-over circuit 13 which is mechanically linked to a conventional manual brake actuator, preferably in the form of a foot-operated brake pedal 12 in such a way that when a vehicle driver actuates the pedal 12 the change-over circuit is transferred to such operating condition that the fed signal in advance of the brake pedal actuation is delivered from the circuit 13 to a memory circuit 15 through a lead 14, said memory being designed and arranged that it preserves the fed signal representing the inclination of the road surface on which the vehicle is running, the value of said inclination being sensed directly before the actuation of brake pedal 12. Simultaneously with the actuation of brake pedal 12, the output fed from the sensor 10 to change-over circuit 13 is fed to a maximum deceleration memory 17 through a lead 16. The outputs delivered from both memories 15 and 17 are fed to a comparator circuit 20 through respective leads 18 and 19. The thus compared difference is delivered from the comparator 20 through a lead 21 to a second comparator 22. The output signal delivered from the first comparator 20 is representative of the combined deceleration degree less that caused to appear on account of occasionally road surface inclination, thus the real vehicle deceleration or acceleration aimed at. In this way, the occasionally appearing apparent deceleration or acceleration of the vehicle directly in advance of the road inclination can be well neglected. The second comparator 22 compares the thus obtained true vehicle deceleration or acceleration with the signal which is fed from a control negative pressure detector 23 through a lead 24 to the second comparator.

When the signal differential from first comparator 20 and that delivered from second comparator 22 reach at a predetermined level, the output signal from amplifier circuit 26 which has been fed with the output from the second comparator through a lead 25 will become substantially nil, thus solenoid-operated orifice valve assembly 28 to which the output from the amplifier 26 is fed through a lead 27 being brought into its off-service position. When this occurs, the fluid communication between vacuum source 29, preferably an engine intake manifold, and a solenoid-operated change-over valve assembly 32 is reduced at the orifice valve assembly 28 which is changed over from its wide opened valving condition to its highly reduced or restricted flow condition, as will be more fully described hereinafter. Vacuum source 29, orifice valve assembly 28 and change-over valve assembly 32 are pneumatically connected one after another through pneumatic conduits 30 and 31, respectively.

The actuating solenoid, not shown in FIG. 1, of the change-over valve assembly 32 is fed with an electric actuating signal delivered from a wheel lock sensor 34 through a lead 33. This sensor 34 is so designed and arranged to sense occasional wheel rotational deceleration and delivers it in the form an electrical signal to the solenoid of valve assembly 32, as referred to above.

When a wheel lock occurs, it is sensed at the sensor or detector 34 and the change-over valve assembly 32 is thereby actuated so that ambient air is delivered through piping 35 and the now actuated valve assembly 32 to a hydraulic brake pressure controller 36 through a communication piping 37, the latter being pneumatically connected through a branch piping 38 to said detector 23.

On the other hand, when the vehicle wheels are not subjected to locking or locked conditions, orifice valve assembly 28 is brought into fluid communication with brake pressure controller 36 which is kept in permanent fluid communication with vacuum source 29 through a conduit 39. The controller 36 is positioned in a communication piping 40a – 40b connecting wheel cylinder means for vehicle wheel braking with a conventional master cylinder assembly 42.

Figure 2:
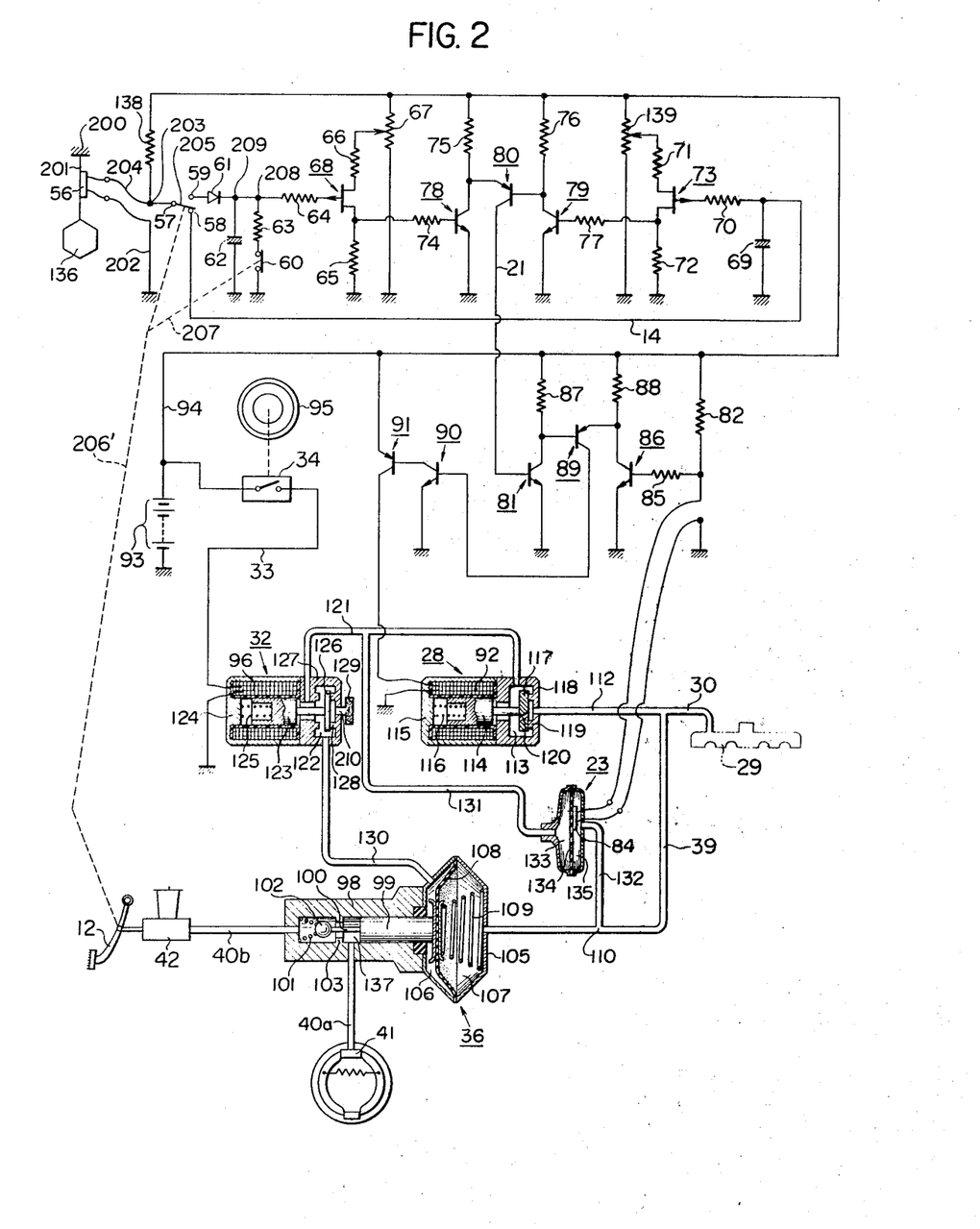
FIG. 2 is a more specifically represented diagram of the schema shown in FIG. 1, wherein several mechanical constituent units are shown in cross-section.

Next, referring to FIG. 2, a detector mass 136 is suspended freely from the vehicle chassis 200 by means of a suspension bar 201 which carries a measuring meter formed into a strain gauge 56. The electric circuit, not shown, on the strain gauge 56 is grounded through a conductor 202, on the one hand, and connected electrically with a terminal 203, on the other hand. By the provision of said measuring mass 136, the latter will represent occasional deceleration of the vehicle chassis 200 and the thus sensed deceleration is converted in the strain gauge 56 into a corresponding electric output signal which is then fed through conductor 204 to said terminal 203. These members 56, 136, 201, 202 and 203 constitute in combination the aforementioned vehicle deceleration sensor 10.

Said terminal 203 is electrically connected with a further terminal 57 about which a switch arm 205 is mounted to swivel. Switch arm 205 is arranged to cooperate either of two stationary contacts 58 and 59. In addition, switch arm 205 is mechanically linked with brake pedal 12 as shown by full line 206 in FIG. 1 and by dotted line 206' in FIG. 2, respectively. These members 57, 58, 59 and 205 constitute in combination the change-over or transfer circuit shown at 13 in FIG. 1. These circuit elements are so arranged that when brake pedal 12 is actuated, switch arm 205 is transferred from its cooperating position with stationary contact 58 into a transferred position kept in contact with the opposite contact 59. In FIG. 2, a further dotted line 207 is shown which denotes that when brake pedal 12 is actuated, a normally closed switch 60 is opened, one end of this switch is grounded, while the opposite end of this switch is connected through resistor 63 with a junction 208. This junction is connected electrically through a further junction 209 and diode 61 to said stationary contact 59. Junction 209 is earthed through a condenser 62, as shown. Condenser 69 serves as a memory element adapted for preserving maximum deceleration of the vehicle converted into an electric signal, as was referred to above. This condenser constitutes a main working element of the memory 17 shown in FIG. 1.

Numerals 63, 64, 65 and 66 denote respective fixed resistors, while numeral 67 denotes a variable resistor. Numeral 68 denotes a field-effect transistor having a high input impedance, so as to constitute the main working member of the maximum deceleration memory circuit 17. On the other hand, condenser 69, resistors 70, 71 and 72 and field-effect transistor 73 constitute in combination the road surface inclination memory circuit 15 shown in FIG. 1.

Resistors 74, 75, 76 and 77 and transistors 78 and 79 constitute in combination a bridge circuit which is actuated upon reception of outputs from the memory circuits 15 and 17. Transistor 80 acts to receive unbalanced output from said bridge circuit, thus acting as the main working member of said first comparator 20.

The output from transistor 80 is fed to the base electrode of transistor 81.

The negative pressure detector 23, FIG. 1, is more specifically shown in FIG. 2, as being denoted with same reference numeral. This detector is fitted with measuring means formed into a strain gauge 84. By the provision of resistor 82, strain gauge 84 and input resistor 85, the thus energized transistor 86 operates with a different amplification degree from that of said comparator transistor 81. Transistors 81 and 86 and resistors 87 and 88 constitute in combination a further bridge circuit, the unbalanced output thereof is taken out through transistor 89, thereby providing the second comparator 22, FIG. 1.

Said amplifier circuit 26, FIG. 1, comprises transistors 90 and 91, the output from this amplifier is fed to coil 92 which serves as the driver for said orifice valve assembly 28 shown in more specific manner in FIG. 2.

Battery 93 is grounded with its negative pole, while the positive pole thereof is electrically connected with a lead 94.

Numeral 95 represents representatively vehicle wheel means which is connected with said wheel lock sensor 34 arranged to close when it senses an impending or already realized lock condition of said wheel means 34 so as to provide an electric output signal therefrom, which signal is then fed to a drive coil 96 of change-over valve assembly 32.

Hydraulic brake pressure controller 36 is connected hydraulically through piping 40b with master cylinder assembly 42, as was referred to hereinbefore; said controller comprises a cylinder 98 which receives slidably a plunger 99 in its axial direction. The plunger 99 is formed concentrically with a reduced extension 100 kept in pressure contact with a check ball 102 which is urged resiliently to move in the right hand direction in FIG. 2 by means of a back-up spiral spring 101 abutting with its base end upon the inside end wall surface of the cylinder 98. An inwardly projecting collar 103 is formed on the inside wall surface of the cylinder, the central bore of said collar forming a valve seat for said check ball when the latter has been brought into its closed position. A conduit 40a extending from the axial bore space of the cylinder through the wall thereof is fluidically connected with wheel brake cylinder means 41 only schematically and representatively shown. Servo section 105 is fixedly attached to the right hand end of the cylinder 98 of the brake pressure controller 36, the corresponding extremity of said plunger 99 being kept in pressure engagement with a diaphragm piston 108 for performing a unitary movement therewith and dividing the interior space of the servo section into two separated chambers 106 and 107.

Diaphragm piston 108 is resiliently urged by an urging spring 109 in the left hand direction in FIG. 2. The chamber 107 is fluidically connected through pipings 110, 39 and 30 to the vacuum source 29. Piping 30 is fluidically connected through a piping 112 to a chamber 113 of the orifice valve assembly 28.

This assembly 28 comprises solenoid coil 92 having a plunger 114 which is normally urged resiliently to move in the right hand direction in FIG. 2 by a spring 116 tensioned between stationary core 115 constituting part of the housing of the orifice valve assembly 28, and the plunger, the latter being rigidly fixed with a valve member 117. This valve member is normally kept in pressure contact with its valve seat 119 formed on the inner end wall surface of the housing 118.

An orifice 120 is formed through the valve member 117 which serves normally for establishing a fluid communication of vacuum source 29 through pipings 30 and 112; a small space defined by the valve seat shaped into a ring projection; orifice 120; valve chamber 113 and piping 121 with the interior space of the solenoid-operated change-over valve assembly 32, or more specifically a chamber 122 thereof.

A plunger 123 is slidably arranged so as to cooperate with stationary solenoid coil 96, and urged normally and resiliently by a spring 125 tensioned between the end wall part acting as core piece 124 and the plunger 123. A valve member 126 is connected rigidly and concentrically with the plunger and kept normally in tight and pressure contact with valve seat 128 shaped into a stationary concentric ring formed on the inside end wall surface of the housing 127. The space defined by the ring-shaped valve seat is fluidically connected through a conduit 210 passing through the housing wall, with an air cleaner 129.

Valve chamber 122 is fluidically connected through a piping 130 with said chamber 106 of servo section 105. Piping 121 is fluidically connected through piping 131 with the chamber 133 of negative pressure detector 23. Numeral 134 denotes a resilient partition wall member which serves for dividing the interior space of said detector 23 into two separate chambers 133 and 135. Chamber 135 is fluidically connected through pipings 132, 39 and 30 to the vacuum source 29.

The operation of the whole arrangement so far shown and described is as follows.

Figure 3:
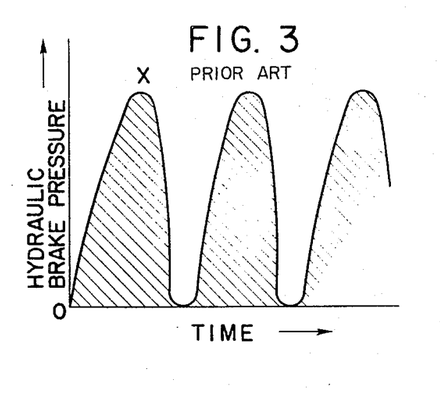
FIG. 3 is a chart wherein the hydraulic brake pressure is plotted against time, showing a series of hydraulic brake pressure undulations appearing in an excess brake application according a comparative prior technique.

When the vehicle driver has exerted an excess and sudden braking effort upon the brake pedal 12, the hydraulic brake pressure will be increased as the time elapses, as shown schematically by a curve O–X in FIG. 3, to such a degree that an impending lock of vehicle wheel means has been invited, until the hydraulic brake pressure reaches its maximum value. At this stage, the pressure is reduced so as to allow rotation of wheel means 95 to be thereby restarted, thus releasing the locked conditions of said wheel means.

For a preliminary guidance, the working mode of a conventional antiskid brake system will be explained briefly by reference to FIG. 2, so far as the shown arrangement is concerned with the prior comparative technique.

When a locked or impending lock condition of wheel means 95 is sensed in the sensor 34, an electric output signal therefrom is delivered to the coil 96, thereby the change-over valve assembly 32 being brought into actuation and the hitherto established fluid communication between pipings 121 and 130 being interrupted, while a fluid communication between air cleaner 129 and said piping 130 is newly established. Thus, atmospheric air is supplied to the chamber 106 of pressure controller 36. A pressure differential thus created between both chambers 106 and 107 will cause the plunger 99 to move rightwards in FIG. 2 against the action of spring 109. By this movement of plunger 99, the check ball 102 is brought into pressure engagement with valve seat 103 under the action of spring 101, so as to interrupt the fluid communication between master cylinder 42 and wheel cylinder means 41. With further rightward movement of plunger 99, the volume of chamber 137 interrupted from fluid communication with the master cylinder is increased correspondingly, thus the hydraulic pressure fed to the wheel cylinder means 41 being reduced, so as to reduce the hydraulic braking effort. With the hydraulic braking effort thus reduced, the hitherto locked or impending lock condition of wheel means 95 being released. Under these operating conditions, the sensor 34 will become non-conductive and the change-over valve assembly 32 is brought into its off-service position and vacuum pressure is fed to the chamber 106 of brake pressure controller 36, so as to reduce the pneumatic pressure differential between both chambers 106 and 107. The plunger 99 is returned to its normal position shown, under the action of spring 109. The effective volume of the chamber 137 will also become reduced to its starting or regular value. Therefore, the hydraulic brake pressure is considerably reduced or even released and fluid communication between master cylinder 42 and wheel cylinder means 41 will be recovered again. In this way, the brake pressure will be increased again until said wheel means will have become again locked, and so on.

Therefore, the hydraulic braking operation will progress in the wavy manner, as shown by a performance curve on the chart in FIG. 3. The shaded area represents the consumed energy during the progress of the braking action.

Further, the operation of the arrangement adapted for carrying out the method according to the invention which comprises vehicle deceleration memory means and solenoid-operated orifice valve assembly will be set forth hereinbelow.

In advance of actuation of brake pedal 12, the switch 60 is closed so that the potential in condenser 62 is nil. Switch arm 205 is kept in contact with stationary contact 58.

Under these conditions, condenser 69 is charged with a divided voltage by strain gauge 56 and resistor 138, said gauge having sensed the apparent deceleration of the vehicle, representative of the inclination of a sloped road surface provided that the vehicle is running therealong.

When the vehicle driver actuates the brake pedal 12 suddenly and considerably, so as to stop the running vehicle, the normally closed switch 60 is opened and at the same time the contacts 57 and 59 are brought into mutually closed position a voltage corresponding to the sum of the deceleration caused by the brake application and the degree of deceleration caused by the occasional inclined conditions of the traffic road is fed through diode 61 to condenser 62 and charged therein. By the actuation of diode 61, a maximum potential which corresponds to the maximum degree of deceleration appeared in the course of the brake application in said condenser 62. By the potentials at the condensers 62 and 69, the field effect transistor 68 and 73 are actuated. Since the field effect transistor has a considerable high input impedance, its degree of conductivity is not practically subjected to any alteration during the whole braking period which normally extends for 3.5–4.0 seconds when it is assumed to stop the vehicle running at about 60 km/hr to nil. The transistors 78 and 79 which constitute a bridge downstream of the field effect transistors 68 and 73, are in their degree of conductivity corresponding to the respective potentials at condensers 62 and 69. Therefore, it can be said that the degree of conductivity of transistor 78 corresponds to the maximum encountered degree of acceleration added with the degree of deceleration defined by occasional inclination or slope of the traffic road, while that of transistor 79 corresponds to the slope of the road surface.

Figure 4:
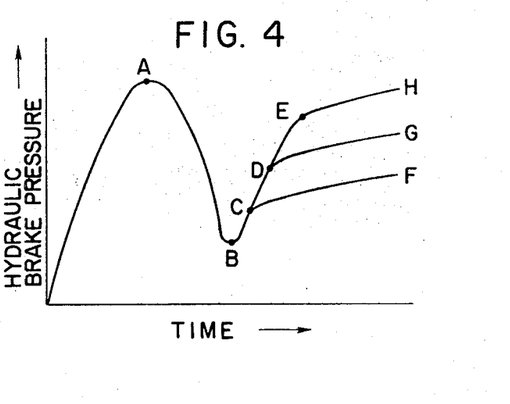
FIG. 4 is a similar view to FIG. 3, showing, however, an improved technique according to this invention.

Therefore, the degrees of conductivity of transistors 78 and 79 have a relative difference corresponding to the degree of maximum deceleration relative to each other, and the bridge circuit is in its unbalanced conditions caused by such differential, which is then taken out through transistor 80 and the transistor 81 is driven, so as to have a conductivity corresponding to a true deceleration degree to which the vehicle has been subjected. On the other hand, the detector 34 senses the locking or locked conditions of the vehicle wheels, thus reducing the hydraulic pressure in the manner as shown in FIG. 4.

At this stage, the maximum deceleration degree has been accumulated in the memory circuit 17 provided for this purpose, thus delivering a signal corresponding to the true degree of deceleration for letting the transistor 81 conductive to such degree. When the locking or locked conditions of the vehicle wheels are sensed in the above mentioned way, solenoid operated change-over valve 32 is actuated to reduce the hydraulic brake pressure, thereby reducing the braking action in the manner as shown by the curve A–B.

Upon the release of the brake application in the above manner so as to begin the recovery of vehicle wheels rotation, solenoid-operated change-over valve 32 is turned into its non-operating conditions, while solenoid-operated orifice valve 28 is kept in its operating position, since, at this stage transistor 81 in the related bridge circuit is kept well in its conductive position and thus transistors 89, 90 and 91 are also in their operating condition. Thus, vacuum pressure is conveyed from vacuum source 29 to the chamber 106 of pressure controller 36, so as to reduce the volume of chamber 137 suddenly, thus the hydraulic pressure fed to wheel brake cylinders 41 being increased in an abrupt way, as shown by a curve B–C in FIG. 4. The point C, in FIG. 4, below which the orifice valve 28 is kept in its off-service position is determined in the following manner of operation. More specifically, the detection of the non-operation of the valve 28 is performed by utilizing such fact that the reduction in the pressure differential between chambers 133 and 134 is in relation to the rise in the brake oil pressure. Since transistor 86 is biased by the output from strain gauge 84 and resistor 82, the degree of conductivity of said transistor 86 will increase with rise of the control negative pressure or with reduction of the pressure differential between the chambers 133 and 134, until the conductivities of transistors 81 and 86 will become equivalent to each other, thus the related bridge restoring its balanced condition, thus transistors 89, 90 and 91 being brought into their non-conducting position. The larger the sensed maximum deceleration in the vehicle deceleration sensor 10, said maximum deceleration being practically in relation with the occasional coefficient of adhesion between the vehicle wheels and the ground surface, the larger will be the degree of conductivity of transistor 81, so that for interrupting the transistor 89, the conducting degree of transistor 86 must be substantially equal to that of transistor 81. For the realization of this operating condition, it will be easily understood that both transistors 81 and 86 do not become substantially equally conductive, until the resistance at strain gauge 84 attains a substantially high value and thus the hydraulic brake pressure fed to wheel brake cylinders 41 reaches a considerably high value. With a higher value of the sensed maximum deceleration degree, the secondary brake pressure increase will become higher as at a point E shown in FIG. 4. This point E lies at a lower level than the maximum hydraulic brake pressure, the differential corresponding always to the sensed maximum deceleration degree in the above sense.

When transistors 81, 86 become conductive substantially to an equal degree, transistors 89, 90 and 91 will be turned to non-conductive, so that orifice valve will be brought into its non-operating position and valve 117 is brought into pressure engagement with valve seat 119. At the time point where the brake pressure reaches at E, FIG. 4, orifice valve 28 will be electromagnetically closed, then, vacuum pressure will be introduced gradually into chamber 106 through the orifice 120 bored through valve member 117 of orifice valve assembly 28. Therefore, the hydraulic brake pressure will be increased only gradually downstream of said point E, thus describing a slower curve E–H in FIG. 4.

Upon this secondary increase of the hydraulic brake pressure, the vehicle wheels should become locking or locked again, the aforementioned operation will be once more repeated, and so on.

When the sensed maximum deceleration degree be smaller, transistors 81 and 86 will become conductive to a substantially same degree with smaller deformation of strain gauge 84 and with smaller conductivity of transistor 86, so as to bring solenoid-operated orifice valve 28 into its de-energized position. Therefore, the braking pressure curve will go along that shown at B–C–F in FIG. 4 as an example.

By accumulating the occasional vehicle deceleration degree in a memory and utilized in a specific manner as shown and described so far in the foregoing description, the hydraulic braking system can be improved. In the presently proposed technique, the hydraulic brake pressure is increased rapidly at a certain point which corresponds to that where the vehicle wheels become impendingly locking or are positively brought into locked condition, less a value corresponding to the said sensed maximum deceleration degree, and then the pressure is gradually increased. By this measure, the effective braking energy consumed for this purpose is considerably larger than the conventional case where the brake hydraulic pressure variation will generally take the form of a wavy curve as shown in FIG. 3, thereby providing a less repeated number of locking and lock-releasing phenomena appearing during the progress of the braking operation until a dead stop of the vehicle is realized, and thus realizing a considerably shortened braking distance. It will be easily appreciated that according to this invention, the number of brake shocks felt by the riding personnels is considerably smaller than that encounted with conventional antiskid braking systems.

When the coefficient of adhesion of the traffic road surface should become larger upon occurrence of the first wheel lock, the braking pressure downstream of point C, as an example, can be increased gradually, so as to apply a heavier brake pressure than that applied at the initial wheel lock point.

In consideration of such case wherein the coefficient of adhesion with the traffic road surface should become smaller during brake application, such measure can be adopted that lock detector 34 and switch 60 are brought into cooperation upon a secondary wheel lock is sensed in such a way that the memory can be accumulated the now modified value of maximum deceleration degree corresponding to the now reduced coefficient value of the above kind and in place of the former one.

As a modified way of sensing the vehicle deceleration degree, the brake reaction of the vehicle wheels acted upon from the side of the road surface appearing upon brake application can be utilized in place of measurement of vehicle deceleration degree. The main and substantial feature of the present invention, the occasional coefficient of adhesion acting between vehicle wheels and traffic road surface is taken into consideration for carrying out the antiskid brake hydraulic pressure control.

Next referring to FIGS. 5–17, 210 denotes a conventional master cylinder shown in a simplified way by a block and is mechanically connected with the brake pedal 211. The interior space of the master cylinder, acting as a hydraulic chamber, is fluidically connected with vehicle front wheel cylinders 214a and 214b through connecting pipings 212 and 213.

Figure 5:
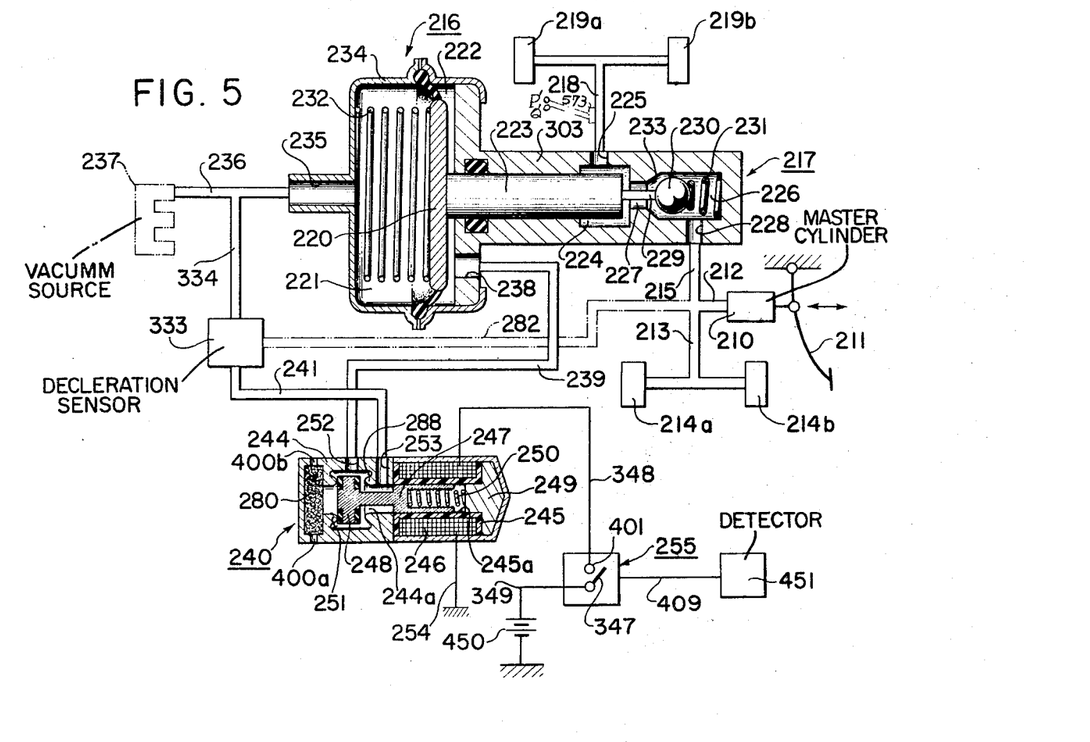
FIG. 5 is a schematic arrangement view of a second imbodiment of the invention, wherein several mechanical constituents are shown in axial cross-section.

The master cylinder 210 is fluidically connected through pipings 212 and 215 and port 228 to the valve chamber 226 of a hydraulic pressure controller 217, thence through passage 227, port 225 and piping 218 to vehicle rear wheel cylinders 219a and 219b, said controller being fitted at its left hand end in FIG. 5 with a conventional servo mechanism 216 comprising a housing 234, the interior space of which is divided into two separate chambers 221 and 222 by a diaphragm piston 220 movably mounted within the housing 234.

A plunger 223 is kept in pressure contact with said diaphragm piston and received in the cylinder 303 of the controller 217, the free end of said plunger projecting into the hydraulic chamber 224. This chamber is hydraulically connected through axial passage 227 to the valve chamber 226. A reduced extension 229 is concentrically provided at the free end of said plunger and passes through said passage 227 with ample plays, the free end of said plunger extension being normally kept in pressure engagement with a check ball 230 under the action of an urging spring 231 and against the action of a counter spring 232. A valve seat 233 is provided for cooperation with the check ball 230 which is however kept normally in separated condition from the mating valve seat. The urging spring 232 is contained in the chamber 221 and under pressure between the housing 234 and the diaphragm piston 220, thereby urging resiliently the combined diaphragm piston and plunger in the right hand direction in FIG. 5.

The right hand servo chamber 222 is fluidically connected through port 235 and conduit 236 to a vacuum source 237. The chamber 222 is further connected normally and fluidically through port 238, piping 239, electromagnetically operated pressure reducing valve 240, piping 241, electromagnetically operated vehicle deceleration sensor 333 and pipings 334 and 236 again to the vacuum source 237.

The valve 240 comprises a housing 244 and a bobbin 245 positioned firmly therein, solenoid coil 246 being wound around said bobbin. A plunger 247 is slidably mounted in the axial bore 245a of said bobbin, a valve member 248 being rigidly coupled physically with said plunger. Spring 250 is tensioned between core piece 249 and said plunger 247, thereby the valve member being normally kept in pressure engagement with a valve seat 251. Core piece 249 is held firmly within the housing 244 which is formed with communication ports 252 and 253 and further with air inlet ports 400a and 400b. Ports 252 and 253 are kept in fluid communication with respective connecting pipings 239 and 241, respectively.

One end of solenoid coil 246 is electrically connected with a lead 348 leading to a stationary contact 401 adapted for cooperation with switch 347, the latter being connected through a lead 349 to the positive pole of the current source 450, while the negative pole of the latter is earthed, as shown. The detector 451 is designed as conventionally as to provide an instruction signal, when it senses the rotational variation of the vehicle wheel should exceed beyond a predetermined value. Since the detector is electrically and indirectly connected with the switch 347, the generated instruction signal is delivered to the computer for closing the switch.

The sensor 333 is fluidically connected through a piping 282 and piping 212 with master cylinder 210.

Figure 6:
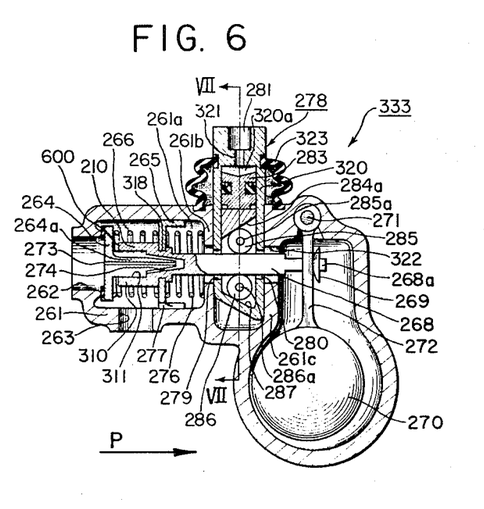
FIG. 6 is a longitudinal sectional view of a vehicle deceleration sensor employed in the second embodiment shown in FIG. 5.
Figure 7:
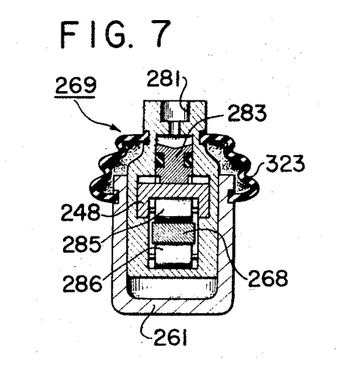
FIG. 7 is a sectional view taken along a section line VII—VII shown in FIG. 6.

A representative design of the aforementioned deceleration sensor 333 is shown more specifically in FIGS. 6–7. This sensor comprises a housing 261 to which an end member 264 having an axial bore 273 is concentrically and fixedly attached, said bore being fluidically connected with said pipings 334 in FIG. 5. Spring 266 is mounted under pressure between the end member 264 and a stop member 265 which is slidably received in the interior space 261a of housing 261. A movable rod 268 is formed rigidly with a concentrically enlarged extension shaped into a cup 310 which is connected firmly through a tongue-and-groove connection 318 with said stop member 265. The rod 268 is formed at its opposite end with a reduced extension 268a which is provided at its free end with a resilient stop 269 for cooperation with the stem 272 of a freely suspended pendulum 270. The inside wall surface 311 of the cup 310 is always kept in separation from the outer peripheral surface of the reduced inner end part 264a of said end member 264. The top end of the stem 272 for the pendulum 270 is swivelled in the wall of housing 261 by means of a pivot pin 271 supported thereby.

A counter or balancing spring 276 is mounted under tension between movable stop member 265 and a separating wall 261b made integral with the wall of said housing 261. A fluid passage 277 is provided through said movable stop member 265 for establishing a permanent fluid passage between the both side spaces of the housing 261 separated from each other by the stopper-cup assembly 265; 310. Port 263 is connected with said piping 334, although not specifically shown.

The numeral 278 represents generally a one way clutch assembly which is slidable laterally of the longitudinal axis of said housing and comprises a hollow and slidable cylinder member 320 having an inclinedly pointed lower end edge. The wall of the hollow cylinder 320 is formed with a pair of oppositely arranged openings 279 and 280, the sizes and arrangement of the latter being so selected to allow the main part of said rod 268 to pass through with ample play. The slide cylinder 320 has an interior space 320a containing a slidable piston 283 and kept in fluid communication through an intermediate reduced passage 321 with an uppermost opening 281 which is kept in permanent fluid communication through piping 282 (FIG. 5) with the master cylinder 210. A pair of rollers 285 and 286 are mounted rotatably within the interior space of slide cylinder 320 by means of the respective roller shafts 285a and 286a which are supported at their both ends in the wall of the hollow cylinder 320, although the details of the bearing means have been omitted only for the simplicity of the drawing.

The upper roller 285 is kept in contact with the movable rod from upper under pressure exerted by the piston 283 through the intermediary of slidable wedge piece 284 squeezed under pressure between said upper roller and said piston. The lower roller 286 is kept in pressure contact with the movable rod 268, on the one hand, and with the inside inclined bottom wall surface 287 of the slide cylinder. The second separation wall 261c is formed with a passage opening 322 for allowing axial movement of the rod 268. On account of the provision of a pair of the rightwardly reducing wedge surfaces 284a and 287 cooperating with the roller pair 285–286 kept in pressure rolling contact with the rod, the latter can be moved rightwards in FIG. 6 only with slightest possible resistance, yet substantially unable to move axially in the left-hand direction.

In FIG. 6, there is shown an arrow P, representing the forwardly running direction of the vehicle. A dust-proof hood 323 is provided between the slide cylinder 320 and the housing 261 of the sensor assembly 333 for the prevention of otherwise possible invasion of foreign matters from outside into the interior of the housing 261.

In FIG. 5, piping 282 has been shown in chain-dotted lines for demonstrating a possible modification from the present embodiment, as will be later described.

The operation of the second embodiment of the invention so far shown and described is as follows:

In the stage of non-braking of the vehicle wheels, the working parts of the antiskid mechanism are positioned as shown in FIG. 5.

At this stage, vacuum pressure is supplied from the engine intake manifold 237 through piping 236 and port 235 to the left hand servo chamber 221. At the same time, same vacuum pressure is supplied from the intake manifold through pipings 236 and 334, sensor 333, piping 241, port 253, valve space 244a, port 252, piping 239 and port 238 to the right hand servo chamber 222. Under the normal braking effort exerted through brake pedal 211 actuated manually by the vehicle operator, the pressurized oil delivered as conventionally from master cylinder 210 is supplied through 212; 215; 228; 226; 227; 224; 225 and 218 to rear wheel brake cylinders 219a and 219b, respectively. At the same time, the pressurized oil is delivered from master cylinder 210 through pipings 212 and 213 to front wheel brake cylinders 214a and 214b. In this case, the normal braking action is brought about as commonly known among those skilled in the art.

When the vehicle operator exerts manually a sudden and considerable braking effort upon pedal 211 to such a degree that the sensor 451 is caused thereby to operate, switch arm 347 in the computer 255 is brought into contact with its mating stationary contact 401, thus current being supplied from power source 450, conductor 349, the now closed switch unit 347–401 and conductor 348 to solenoid coil 246 of air control valve assembly 240, thereby the solenoid being energized. The armature 247 will thus be moved rightwards in FIG. 5 against the action of spring 250 and the valve 248 being separated from left hand seat 251 and brought into contact with the opposite valve seat 288. In this way, vacuum pressure coming from the engine intake manifold 237 will be interrupted from further conveyance through the now closed valve seat 288.

Atmospheric pressure air is now taken from outside through air filter 280, thence through 244a; 252; 239 and 238 to the right hand servo chamber 222 (FIG. 5). Thus, a pneumatic pressure difference is established between both chambers 221 and 222 and diaphragm piston 220 is moved leftwards in FIG. 5 against the action of the return spring 232. By this leftward movement of diaphragm piston 220, the plunger will be also displaced leftwards, by virtue of the hydraulic pressure in chamber 224, check ball 230 following after this plunger movement under the action of spring 231, until the ball will have been brought into pressure contact with its valve seat 233, the hitherto established hydraulic connection between master cylinder 210 and rear wheel brake cylinders 219a and 219b being thereby interrupted. With further leftward movement of plunger 223 and thus, with corresponding increase of the volume of the hydraulic chamber 224, the hydraulic pressure supplied to the rear wheel brake cylinders are reduced or under occasions even released (see, curve B'–C' in FIG. 8).

When the rotational speed of vehicle wheels recover their otherwise realizable one which corresponds to the occasional vehicle speed, by virtue of the reduction of hydraulic brake pressure reduction or release, or when an acceleration of wheels is sensed, the switch arm 347 in computer 255 is brought into its open position, solenoid coil 246 is de-energized and thus the plunger 247 is returned to its left-hand position shown in FIG. 5 under the action of return spring 250.

Upon the realization of the above operation, atmospheric pressure air is delivered from the right-hand chamber 222 of servo mechanism 216 through port 238, piping 239, port 252, chamber 244a, port 253 and piping 241 to the port 262 of deceleration sensor 333, while the port 263 is kept in fluid communication with vacuum source 237. Thus, there will be a pressure difference between both ports 262 and 263 to open the valve member 264 against the action of spring 266. Under these operating conditions, atmospheric pressure air will be sucked from the former port 262 through spring chamber 261a; part 263; and pipings 334 and 236 by the engine suction manifold 237. This valve opening time point corresponds to the point C' in FIG. 8.

By the above operation, the pressure prevailing in the right-hand chamber 222 is reduced and the pressure differential between ports 262 and 263 is reduced until it will overcome the action of spring 266. At this point, the valve 264 is again closed, as shown in FIG. 6. This valve reclosure time point corresponds to D', F' or H' in FIG. 8, as occasion may desire. Upon the valve closure in the above sense, the reduced pressure air prevailing in the chamber 222 is gradually sucked through port 262, axial bore 273, coned passage 274, axial passage 275, lateral passage 600, spring chamber 261a, port 263 and so on by the engine manifold 237. The hydraulic brake pressure reduction corresponding to this gradual control air pressure reduction will be brought about along the curve D'–E', F'–G' or H'–I', as the case may be.

The slope of each of these later stage braking curves is modified according to this invention by the action of vehicle deceleration sensor shaped into a freely suspended pendulum 270 which, when brought into operation, affects upon the effective passage area at 274 in FIG. 6.

By the aforementioned brake pressure reduction or release, the pendulum 270 will be subjected a relative deceleration in the travelling direction of the vehicle shown by an arrow P in FIG. 6, thus the rod 268 kept in cooperation with said pendulum being shifted rightwards. In the course of the braking operation, pressurized oil is always conveyed from master cylinder 210 through pipings 212 and 182 to the port 281, so as to act upon vertical piston 283 for squeezing the rod 268 from upper and below by means of roller pair 285 and 286. As seen, the rod 268 is prevented from its leftward movement in an effective way by the wedge action provided by the inclined block 284 and the inclined surface 287 cooperating with each other through said roller pair. It will thus be seen that the occasional distance of rightward shift of said rod 268 caused by the swivel of pendulum 270 influenced by said vehicle deceleration corresponds to a memorized value of the occasionally sensed maximum deceleration degree of vehicle appearing in the braking action.

With larger deceleration degree of the vehicle, the suspended pendulum will be subjected to a larger swivelling motion about its suspended point 271 and in the vehicle traveling direction which means the right-hand direction in FIG. 6. In this case, the rod 268 will be shifted to a correspondingly larger degree, thus compressing the spring 276 correspondingly and through the intermediary of slidable spring mount 265. At the same time, the spring 266 will be correspondingly expanded, thus the spring closing pressure upon valve member 264 being correspondingly weakened.

Figure 8:
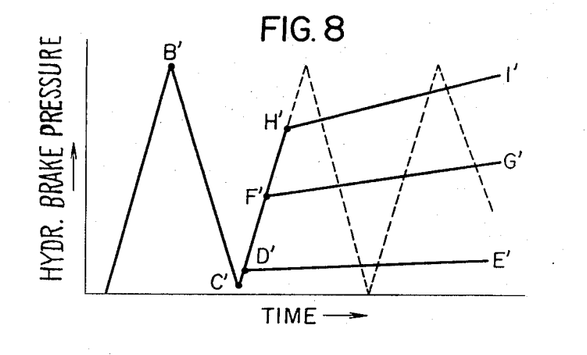
FIG. 8 is a comparative chart wherein the hydraulic brake pressure is plotted against time and comparison is made between the inventive method (full line) and the conventional method (dotted line).

Thus, the valve which has been opened under the pneumatic pressure differential appearing between ports 262 and 263 at the time corresponding to the point C' in FIG. 8 will be subjected in this case to a rather smaller valve opening pressure exerted by spring 266, resulting in a correspondingly reduced pneumatic pressure differential and thus a more increased degree of hydraulic brake pressure by virtue of longer opening period of said valve 264. This means that the refracting point will be moved from D' to H', as an example. In this case, the coned valve passage area at 274 will become correspondingly enlarged so that the later stage hydraulic brake pressure curve may have a steeper slope as seen at H'–I'.

On the contrary, when the sensed vehicle deceleration degree is smaller, the swivelling angle of the pendulum will be correspondingly smaller and the results will be the reverse. Therefore, the brake pressure reincrease curve in this case may be as shown at D'–E'. Naturally, the curve may take an intermediate progress as shown at F'–G' in FIG. 8.

Figure 9:
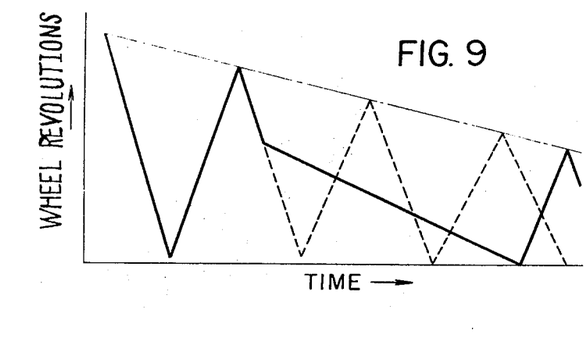
FIG. 9 is a comparative chart wherein the wheel revolutions are plotted against time and comparison is made between the inventive method (full line) and the conventional method (dotted line).
Figure 10:
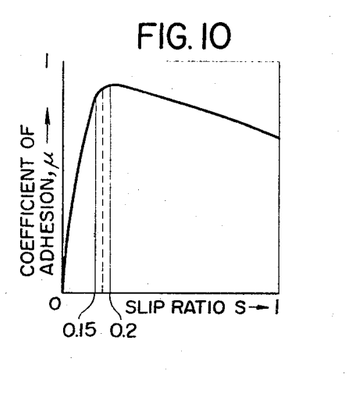
FIG. 10 is a chart wherein coefficient of adhesion is plotted against slip ratio, for showing that the maximum value of said coefficient substantially within a specific value of slip ratio ranging between about 0.15 and about 0.2.

In FIG. 9, the revolutions of the vehicle wheel appearing in the progress of the braking action so far described with reference to the second embodiment have been plotted against time are shown by way of example and in full lined curves. The dotted lines show the corresponding results of a comparative conventional device. It will be seen that the results of the invention are highly superior and efficient, especially when observing from the comfortableness of car driving.

It will be further seen from the foregoing that the design and arrangement of main working parts of the present and foregoing embodiments can be choosen to operate the braking system in a sudden and excessive application thereof substantially within a limited range of the coefficient of adhesion appearing between the vehicle wheel and the traffic road surface to be those which correspond substantially to slip ratio of 0.15–0.2. According to our experiments, most superior braking efficiency is attained for this specific range of slip ratio, as seen from FIG. 10.

Figure 11:
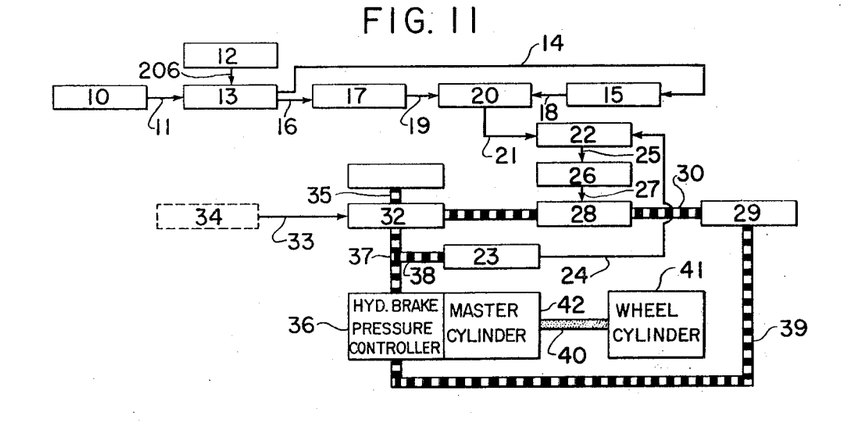
FIG. 11 is a block diagram showing a third hydraulic brake system embodying a third embodiment of the invention.

In FIG. 11 which is similar to FIG. 1, showing a modified general arrangement therefrom. For easy comparison and understanding, same or similar constituents to those shown in FIG. 1 are denoted with respective same reference numerals, such as: 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 41, 42 and 206. Wheel cylinder means 41 and master cylinder 42 are connected with each other in this case by a hydraulic piping 40. Hydraulic brake pressure controller 36 in this case is coupled with master cylinder 42. Substantial features of this arrangement, FIG. 11, can be easily understood without further analysis of the construction and operation thereof and when reference is had to FIG. 1 and its related foregoing disclosure. The difference will become more apparent as the description of the present third embodiment proceeds.

Figure 12:
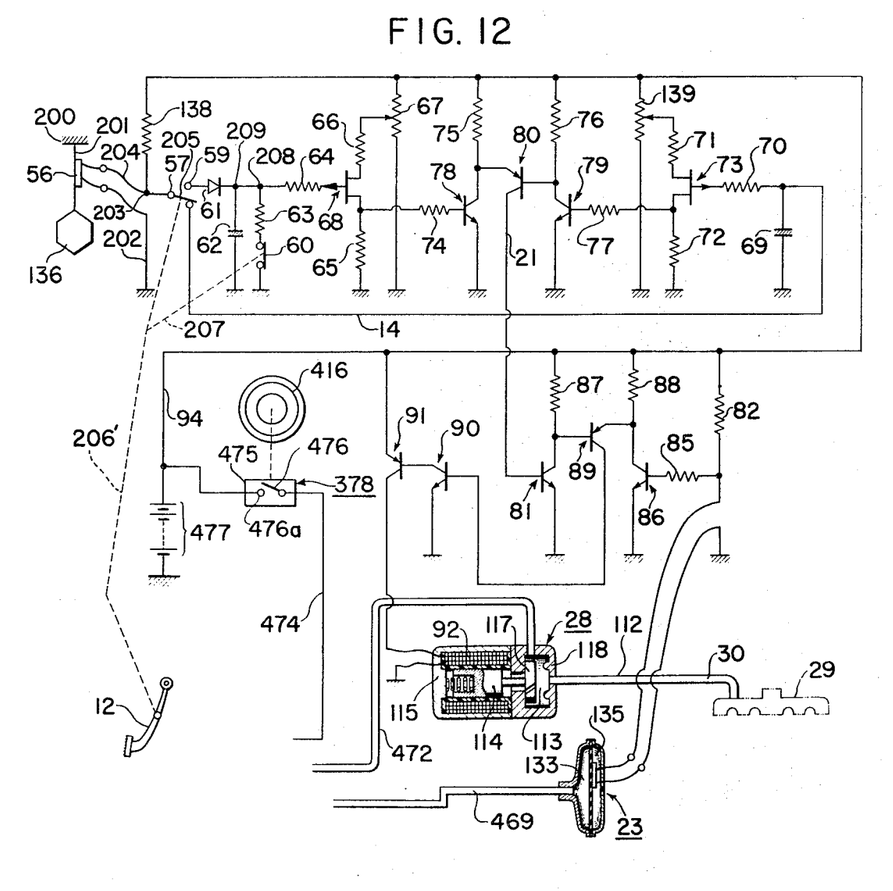
FIG. 12 is a more specific arrangement view of the third embodiment wherein several mechanical constituents are shown in axial section.

The arrangement shown in FIG. 12 is substantially similar to that shown in FIG. 2 of the first embodiment of the invention, and therefore same or similar parts have been denoted with same respective reference numerals. The difference will be described hereinbelow.

Figure 13:
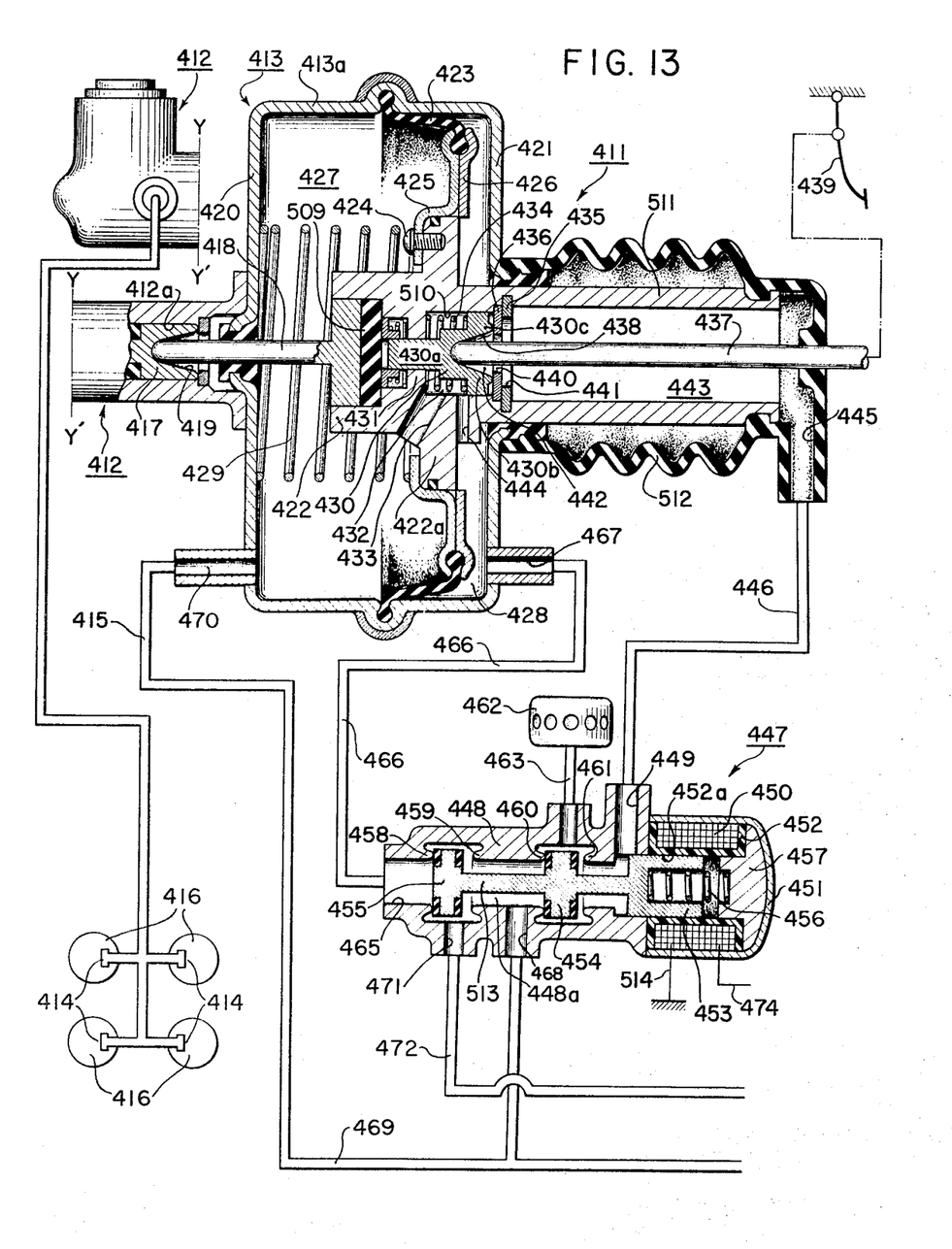
FIG. 13 is a schematic arrangement view of essential parts of a third embodiment of the invention wherein several mechanical parts are shown in axial section.

In FIG. 13, the numeral 411 represents generally a brake booster unit comprising a master cylinder 412 and a servo mechanism 413 coupled therewith. Several wheel brake cylinders 414 of vehicle wheels 416 are hydraulically connected through conduit means 415 with a hydraulic chamber contained as conventionally in the master cylinder 411, although not specifically shown. A piston 417 is slidably received in the interior space 412a of the cylinder 412 and formed at its right-hand end with a deep axial recess 419 kept in mechanical linkage with an actuator rod 418.

The servo mechanism 413 comprises a housing 413a representing front wall 420 and rear wall 421. Within the interior space of housing 413a, a power piston 422 is movably mounted and connected through a buffer member 509 with said actuator rod 418. The housing 413a comprises two elements made integral with front wall 420 and rear wall 421, respectively, the confronting surfaces of these housing elements squeeze positively and firmly the outer peripheral edge of flexible diaphragm 423 and fixture plates 425 and 426 shaped into respective rings and firmly united together grip the inner peripheral edge of said diaphragm in a positive way, the inner periphery of wider ring plate 425 is fixedly attached to the outer peripheral area of the flange 422a of said power piston by means of a plurality of set screws 424, only one of which is shown however in FIG. 13. The interior space of the housing 413a is divided into two separate chambers 427 and 428 by the power piston thus constructed, said piston being urged rightwards resiliently by a coil spring 429 which is contained in the left-hand chamber 427 and abuts against the front wall 420, on the one hand, and against the piston flange 422a, on the other.

The power piston 422 is formed axially with a complicatedly stepped bore 510 which receives slidably a valve piston 430 comprising a smaller piston element 430a and a larger piston element 430b. The power piston 422 is formed further with an inwardly projecting collar 431 which is kept in sliding contact with the smaller piston element 430a. A pneumatic chamber 432 is defined substantially by said collar 431 and the larger piston element 430b and kept in fluid communication through port 433 with the left-hand servo chamber 427. Within the pneumatic ring chamber 432, there is provided a coil spring 434 which is mounted under pressure between said collar 431 and said larger piston element 430b, thereby the valve piston being urged resiliently towards right. Said valve piston is formed with a valving ring end surface 430c which is kept normally in pressure engagement with a valve seat disc 436 kept in position by means of a snap spring 435. A deep axial recess 438, the outermost extremity of the cone surface of this recess 438 being defined by said end surface 430c, receives the rounded left-hand end of piston rod or pusher 437, the right-hand end thereof being linked with brake pedal 439 which is similar to that shown in the foregoing embodiments by the numeral 12 or 211. For easy and unobstructed movement of the pusher 437, the valve seat disc 436 and snap ring 435 are formed respectively with central openings 440 and 441, respectively, providing thereby ample idle plays and thus the interior space 442 of the reception recess 438 being fluidically connected with the interior space 443 of a hollow concentrically cylindrical extension 411 of the power piston.

A radial port 444 is bored through the wall of power piston 422 so as to normally establish fluid communication between ring space 432 and servo chamber 427. A resilient hood 512 covers whole of said cylindrical extension 511 and is attached to the pusher 437 at its intermediate portion, so as to prevent foreign matters from invading into the cylinder space 443 from outside thereof. The hood 512 is formed with a port 445 communicating fluidically with the cylinder space 443 and connected with a piping 446 which leads to a port 449 formed radially through the wall of housing 448 of air-vacuum change-off valve 447. The housing 448 is formed with a multi-shouldered axial bore 448a which is kept in fluid communication with said port 449. To the housing 448, a cover 451 is fixedly attached and contains therein a stationary solenoid coil 450 wound on a bobbin 452 made of an insulating material. A core piece 457 is rigidly positioned within the cover as shown. A coil spring 456 is tensioned between core piece 457 and electromagnetic plunger 453 which is slidably mounted in the axial bore 452a of bobbin 452. One end of solenoid coil 450 is earthed through conductor 514, while the opposite end of the coil is connected through conductor 474 to a switch arm 476 adapted for cooperation with stationary contact 476a. This switch 476-476a is contained in the circuit of a computer 475. Battery 477 and skid sensor or wheel lock detector 378 are designed and arranged in a similar way with the corresponding elements 95 and 34 shown in FIG. 2. The double piston member 513 is concentrically and rigidly united together with said electromagnetic plunger 453, said member 513 comprising two valve elements 454 and 455.

The valve element 454 acts as an air valve which cooperates selectively with a pair of oppositely arranged valve seats 460 and 461. The remaining valve element 455 acts as a vacuum valve which cooperates selectively with a further pair of oppositely arranged valve seats 458 and 459. By the provision of the urging spring 456, the plunger-double piston assembly 453; 513 is resiliently urged to move leftwards in FIG. 13 so that both valve elements 454 and 455 are kept in cooperation with respective left side seats 460 and 458, respectively.

Air cleaner 462 is connected fluidically through a piping 463 to a vehicle deceleration sensor with the interior space of air-vacuum change-off valve 447.

The housing 448 is formed further at its left-hand end with a port 465 which is fluidically connected through a piping 466 with a port 467 permanently kept in fluid communication with the right-hand servo chamber 428. A port 468 bored laterally through the wall of housing 448 and positioned between said valve seats 459 and 460 is fluidically connected through a piping 469 to the left-hand servo chamber 427 of servo unit 413 through a port 470, on the one hand, and with said sensor 23. The housing 448 is formed further with a port 371 which is fluidically connected through a piping 372 to a proper vacuum source shaped again in the form of an engine intake manifold 373, as only schematically shown.

Normally, air cleaner 462 is kept in communication with piping 447 through piping 463; and valve chamber around valve member 454.

The port 465 is kept in fluid communication through piping 466 with port 467. Port 468 is kept in fluid communication through piping 469 and port 470 with the left-hand chamber 427 of said servo mechanism 413. Further port 471 is kept in fluid communication through piping 472, solenoid orifice valve 28 and piping 30 with vacuum source 29.

The construction of orifice valve assembly 28 is similar to that shown in FIG. 2.

In the present embodiment, when a sudden and substantial braking effort is applied for unintentionally inviting an impending or already realized wheel lock condition, the operation is substantially shown in FIG. 4. Thus, the hydraulic brake pressure will rise at first along the curve portion O-A. In this case, upon actuation of brake pedal 439 for this purpose, switch 60 is opened and at the same time switch arm 57 is brought into contact with stationary contact 59.

Therefore, a voltage corresponding to a sum of the deceleration caused by the brake application and the deceleration brought about by the occasional existence of slope of the traffic surface, will be charged at condenser 62 through diode 61. Through the action of said diode, it should be understood that the largest possible deceleration appearing in the brake application is accumulated in the form of electrical potential in the said condenser, and so on, as was described hereinbefore by reference to FIG. 2.

The unbalanced voltage differential appearing in the last stage bridge circuit and corresponding to the maximum possible value of vehicle deceleration is taken out again through transistor 80, thus resulting in the drive of transistor 81 at its specific conductivity corresponding to the true deceleration. On the other hand, sensor or computer 475 which is similar to that denoted 34 in FIG. 2 senses the impending or already attained wheel lock condition and the results are such that the hydraulic brake pressure will be reduced in a sudden way along the curve portion A-B shown in FIG. 4.

As was already mentioned, the maximum deceleration degree encountered in the brake application is preserved in the memory 17, FIG. 11, and the transistor 81 has its conductivity corresponding to the true deceleration degree. On the other hand, when the sensor 475 senses a wheel lock, the change-off valve assembly 32 is brought into actuation, as was referred to, thereby the hydraulic brake pressure being reduced along the curve portion A-B, FIG. 4, as an example. Upon release of the hydraulic brake pressure in the above manner, the vehicle wheels start to rotate again and the valve assembly 32 is turned to its non-operating position as before.

Since, at this stage, only one at 81 of the transistors constituting the related bridge is enough conductive, the transistors 89, 90 and 91 are also conductive and thus, the orifice valve assembly 28 is kept in its operating position. Therefore, vacuum pressure will be conveyed from its source 29 to the chamber 427 of booster unit 413 and the active volume of the hydraulic brake circuit 40 extending from master cylinder 42 to brake cylinders at 41 in FIG. 11 and more specifically at 414 in FIG. 13 is abruptly reduced for increasing corresponding the brake application force. This operation is expressed by curve B–C in FIG. 4. The point C corresponding to the transfer of the valve 28 to its non-operative position is determined as substantially referred to hereinbefore with reference to FIG. 2.

The main difference of the present embodiment from the foregoing resides in such that the conventional servo mechanism of a brake booster assembly is utilized for the servo device necessary for the antiskid brake pressure control system, thus providing a highly simplified pressure control system for the same purpose.

Next, referring to FIGS. 14–16 in combination with FIG. 5 a fourth embodiment of the invention will be described in detail.

Figure 14:
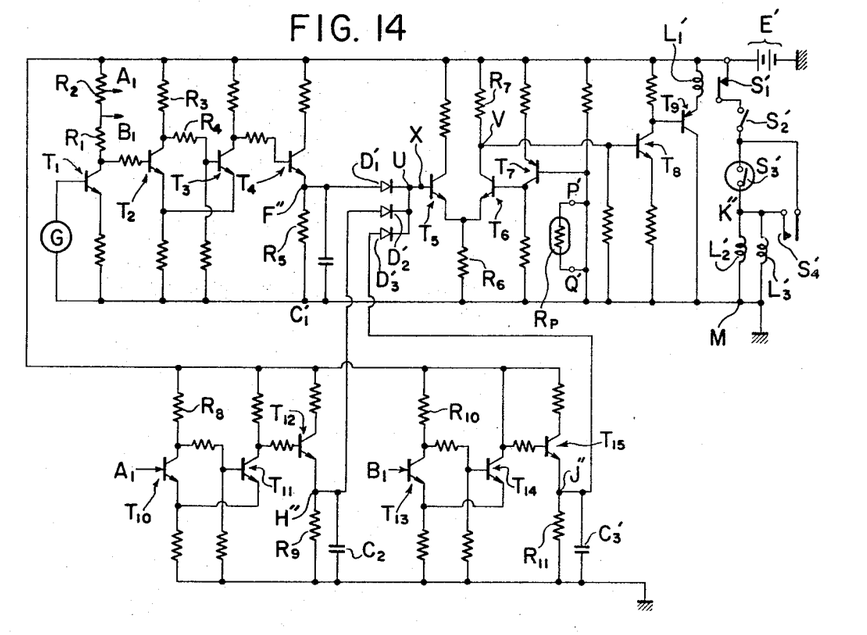
FIG. 14 is a circuit diagram showing electronic section of a fourth embodiment of the invention.

In FIG. 14, G denotes in a simplified way a conventional secondary derivative generator adapted for sensing vehicle wheel angular acceleration. This generator G delivers all times variable output voltage signal corresponding to occasional angular acceleration of vehicle wheel means. The generator G is electrically connected to the base electrode of transistor $T_1$, while the collector electrode of the latter is connected through resistor $R_1$ to terminal $B_1$; through resistor $R_2$ to terminal $A_1$, on the one hand, and to the base electrode of transistor $T_2$, on the other.

Collector electrode of transistor $T_2$ is connected through resistor $R_3$ to positive side of current source E, on the one hand, and through resistor $R_4$ to the base electrode of transistor $T_3$. Transistors $T_2$ and $T_3$ constitute in combination a Schmitt circuit. Under normal conditions, transistor $T_3$ is conductive, while transistor $T_2$ is non-conductive.

Collector electrode of transistor $T_3$ is connected through resistor to current source E, and through resistor to the base electrode of transistor $T_4$. Emitter electrode of transistor $T_4$ is earthed through resistor $R_5$, and through diode $D_1$ to the base of transistor $T_5$. Resistor $R_5$ and a condenser $C_1$ connected in parallel thereto constitute in combination an integrating circuit adapted for maintaining a certain voltage level at the point $F_1$ for a predetermined time period. Emitter electrodes of transistors $T_5$ and $T_6$ are earthed through a common resistor $R_6$. Collector of transistor $T_6$ is connected through resistor $R_7$ with the current source E, while the collector electrode of the same transistor is connected to the collector of transistor $T_7$. Base electrode of transistor $T_7$ is earthed through a variable resistor Rp, the resistance thereof depending upon the occasional hydraulic brake pressure fed to rear wheel cylinders 219a and 219b.

In the piping 218 leading to rear wheel cylinders 219a and 219b, there is provided a pressure responsive element 573 which has a pair of terminals P' and Q' and is adapted for providing said variable resistance Rp. It will be easily understood that with higher hydraulic brake pressure supplied, the resistance valve will become smaller, and vice versa.

Transistors T5 and T6 constitute in combination a differential amplifier for comparing the voltage in relation to the occasional wheel angular acceleration with that fed to transistor $T_7$ through a variable resistance representing the occasionally fed hydraulic brake pressure.

Base electrode of transistor $T_8$ is connected with collector electrode of transistor $T_6$, the former being always conductive. Base electrode of transistor $T_9$ is connected to collector electrode of transistor $T_8$, while emitter electrode of the former is connected to relay $L_1$ which is arranged to control switch $S_1'$ adapted for on-off control of throttle valve 533. Switch $S_2'$ inserted in parallel to said switch $S_1'$ is arranged to mechanically cooperate with brake pedal 211, the former switch being closed upon actuation of the pedal. Switch $S_3'$ corresponds to that denoted 347 in FIG. 5 and inserted in computer 255.

Coil $L_2'$ has its one end connected with switch $S_3'$ and its other end connected to earth, said coil corresponding to the electromagnetic solenoid 246 shown in FIG. 5. Relay $L_3$ is provided for self-maintaining the circuit including the switch $S_4'$.

Terminal $A_1$ is connected to base electrode of transistor $T_{10}$ and the collector of the latter is connected through resistor $R_8$ to current source E, and to the base electrode of transistor $T_{11}$.

Transistors $T_{10}$ and $T_{11}$ constitute in combination a Schmitt circuit, the former being normally non-conductive and the latter being normally conductive.

Collector electrode of transistor $T_{11}$ is connected to base electrode of transistor $T_{12}$ and emitter of the former is connected to an integrating circuit comprising resistor $R_9$ and condenser $C_2$, said integrator being provided for maintaining the voltage appearing at the point H' for a certain predetermined period.

Emitter electrode of transistor $T_{12}$ is connected through diode $D_2$ to the base electrode of said transistor $T_5$. Terminal $B_1$ is connected with base electrode of transistor $T_{13}$, the collector of the latter being connected through resistor $R_{10}$ to current source E, and to the base of transistor $T_{14}$.

Transistors $T_{13}$ and $T_{14}$ constitute in combination a Schmitt circuit, wherein transistor $T_{13}$ being normally non-conductive and transistor $T_{14}$ being conductive.

Collector of transistor $T_{14}$ is connected to the base of transistor $T_{15}$, and emitter of the former is connected to the integrator comprising resistor $R_{11}$ and condenser $C_3$. The provision of this integrator serves for maintaining the voltage at the point J' constant for a predetermined time period. Emitter of transistor $T_{15}$ is connected through diode $D_3$ to the base of transistor $T_5$.

When a sudden and considerable rise of hydraulic brake pressure so that the sensor 451 (FIG. 5) is brought into actuation, switch arm 347 is closed with stationary contact 401 in the computer 255 for electromagnetically energization of solenoid coil 246 in change-off valve assembly 240. By energization of said coil 246, plunger 247 is attracted rightwards against the action of spring 250, so as to bring the valve 248 into pressure engagement with its opposite seat 288.

Then, the vacuum pressure coming from its source 237 is interrupted at the valve now transferred, while ambient air is conveyed through air filter 280, port 252, piping 239 and port 238 into the right-hand chamber 222 of servo mechanism 216. A pressure differential is established in this way between both chambers 222 and 221 so that diaphragm piston 220 is moved suddenly leftwards in FIG. 5 against the action of spring 232. Thus, plunger 223 will follow thereafter and check ball 230 is brought into sealing engagement with valve seat 233 under the action of spring 231. Therefore, the hitherto established hydraulic communication between master cylinder 210 and rear wheel cylinders 219a and 219b is positively interrupted.

With further leftward movement of plunger 223, the effective volume of chamber 224 is further increased and the hydraulic brake pressure supplied to rear wheel cylinders will be correspondingly reduced (see, curve B'–C' in FIG. 8). By the reduction in the brake pressure, the rotational speed of vehicle wheels may recover that corresponding to the occasional vehicle speed, or the wheels may be subjected to an acceleration, switch 347 in computer 255 will be opened so as to de-energize solenoid 246. Thus, the plunger 247 will be returned to its starting position shown in FIG. 5. It should be noted that in the present embodiment the piping 282 shown in chain dotted lines is dispensed with.

When brake pedal 211 is depressed, switch $S_2'$ is closed. Under these operating conditions, and when an impending or already realized wheel lock is sensed, switch $S_3'$ (or 347 in FIG. 5) is closed and solenoid coil $L_2'$ (or 556 in FIG. 15), thus relay $L_3'$ being actuated to close switch S4'. When the rear wheel rotation recovers a valve corresponding to the occasional vehicle speed, or when alternatively the rear wheels are subjected to an acceleration, switch S3' (or 347 in FIG. 5) is opened. Current continues nevertheless to flow through solenoid coil $L_2'$ (or 556 in FIG. 15) on account of the self-maintaining characteristics of relay $L_3'$. Thus, the valve member 557 in throttle valve assembly 333' is kept in its right-hand position against the action of spring 560. Under these operating conditions, the air filled in the right-hand chamber 222 of servo mechanism 216 (FIG. 5) is conveyed through port 238, piping 239, port 252, chamber 244a, port 253 and piping 241 to port 553. Thus, the air is sucked rapidly through port 552 by the enging manifold 237. By the thus established pneumatic pressure differential across diaphragm piston 220, the latter is urged to move rightwards against the action of spring 232, so as to increase suddenly the effective volume of chamber 221, for supplying again hydraulic brake pressure to the rear wheel brake cylinders 219a and 219b. See, curve C'-D' of FIG. 8, which corresponds to a lower valve of the coefficient of adhesion. Curve C'-F' corresponds to a medium valve of said coefficient, while curve C'-H' is for a higher valve of the coefficient.

This feature can be applied to all the embodiments shown and described.

The wheel acceleration appearing in the brake pressure release is sensed by the sensor G and a corresponding voltage output is applied to the base of transistor $T_1$ which is arranged to become conductive only with difficulty in case of the sensed acceleration be high. Conversely, when the sensed acceleration is of small, the transistor becomes conductive highly easier. Now assuming that a considerably high valve of acceleration is sensed, the equivalent resistance of said transistor $T_1$ will become enough high so that the transistor $T_2$ is turned to its conducting condition upon reception of the generated voltage at the collector of transistor $T_1$.

At the same time, transistors $T_{10}$ and $T_{13}$ become now conductive, while transistors $T_3$, $T_{11}$ and $T_{14}$ are turned to non-conductive and transistors $T_4$, $T_{12}$ and $T_{15}$ become conductive. Since related circuit elements are so designed and arranged that the voltage appearing at several points F'', H'' and J'' satisfy the following condition:

$$F''>J''>H''$$

Therefore, it can be understood that the voltage appearing at the point U is always the highest one of these, and in relation to the sensed acceleration.

As was already referred to, the variable resistor Rp will be smaller for larger valve of the hydraulic brake pressure which affects upon the pressure-responsive solid element 573, and vice versa. Thus, the voltage applied to the base of transistor $T_6$ corresponds in its valve to the voltage appearing at the specific point U. According to the above assumption, the acceleration induced in the vehicle at the present stage amounts to a certain high valve so that the voltage applied to the base of transistor $T_5$ or appearing at the point U has a correspondingly high valve. Thus, unless the voltage applied to the base of transistor $T_6$ is equivalent to or higher than the above specific voltage, the transistor $T_6$ could not become conductive. For this purpose, the resistor $R_9$ is so selected as to have a low valve and it is necessary to apply a considerable amount of the hydraulic brake pressure in order to apply the necessary high voltage to the base of said transistor $T_6$.

Upon conduction of said transistor $T_6$ in the above-mentioned way, the voltage at the point V will decrease correspondingly and transistors $T_8$ and $T_9$ will become non-conductive, thus relay $L_1'$ being deenergized so that switch $S_1'$ is opened. By the open condition of this switch $S_1$, electromagnetic coil $L_2'$ is turned to its de-evergized position and valve member 557 of throttle valve assembly 333' (FIG. 15) is urged to move leftwards under the action of spring 560 and thus brought into pressure engagement with its valve seat 561. This tince point corresponds to the point H' in FIG. 8. By this operation, the air flow coming from the servo mechanism is throttled at 562, FIG. 15, thus the hydraulic brake pressure rising gradually as shown by the curve H'-I' in FIG. 8.

When the vehicle wheels, on the contrary, should be subjected to only a small degree of acceleration, the equivalent resistance in the transistor $T_1$ will become correspondingly smaller and thus the base potential applied to transistor $T_2$ being not capable of bringing transistors $T_2$ and $T_3$ into conduction.

In this case, a voltage in relation to the sensed smaller acceleration is applied to the base of transistor $T_{10}$, so that transistor $T_{11}$ becomes non-conductive, while transistor $T_{12}$ is turned to conductive. In this way, a voltage in response to said acceleration will be applied through diode $D_2$ to the base of transistor $T_5$. Further operation of the device can be easily understood from the foregoing description.

More specifically, however, the hydraulic braking pressure to be supplied to the rear wheel cylinders 219a and 219b will influence through the voltage appearing at the point U upon the transistor $T_6$ which becomes thus conductive and transistors $T_8$ and $T_9$ are turned to non-conductive. By the opening of switch $S_4^1$ thus caused, solenoid $L_2'$ will become de-energized, the valve member 557 being urged to move leftwards under the action of spring 560 and brought into pressure engagement with valve seat 561. This time point corresponds to the point D' in FIG. 8. Then, the brake application will proceed with along curve D'-E'.

In the case of a medium augular acceleration induced in the vehicle wheels, the brake application will be performed along the curve B'-C'-F'-G' in FIG. 8, as an example. In FIG. 15, numeral 554 denotes a housing of the valve assembly 333'; 558 the plunger coupled with said valve member 557; 559 denotes a core piece for cooperation with solenoid coil 556 and said plunger 558.

Figure 16:
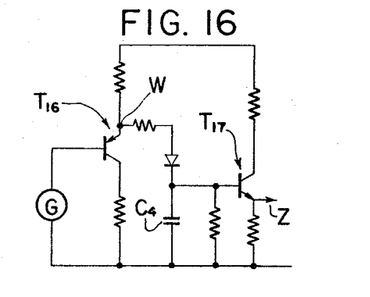
FIG. 16 is a partial wiring connection modified from the corresponding part of the electronic circuit shown in FIG. 14.

Now turning on the modification shown in FIG. 16, when an acceleration is sensed by the sensor G as before, an electric voltage signal is applied to the base of transistor $T_{16}$ which is so designed and arranged to have such an operating character that it provides a correspondingly larger equivalent resistance for larger valve of sensed acceleration, and vice versa.

When assuming there is a considerably high acceleration sensed in the above way, a correspondingly large potential will appear at the point W, and the condenser $C_4$ will accumulate a potential corresponding to the large acceleration. By this accumulated potential, a voltage corresponding to the acceleration is obtained at the emitter of transistor $T_{17}$, the output therefrom being applied through the point Z to the transistor $T_5$. Further operation can be easily understood without further analysis. It can be easily understood further that also in the present fourth embodiment including the modification shown in FIG. 16, that in case of continuously variable wheel angular acceleration, the throttle valve means such as at 333' can be properly regulated the maximum encountered valve of said acceleration.

Finally, referring to FIG. 17 in combination with FIGS. 6-7 and the like, the fifth or final embodiment will be described in detail.

Figures 15, 17:
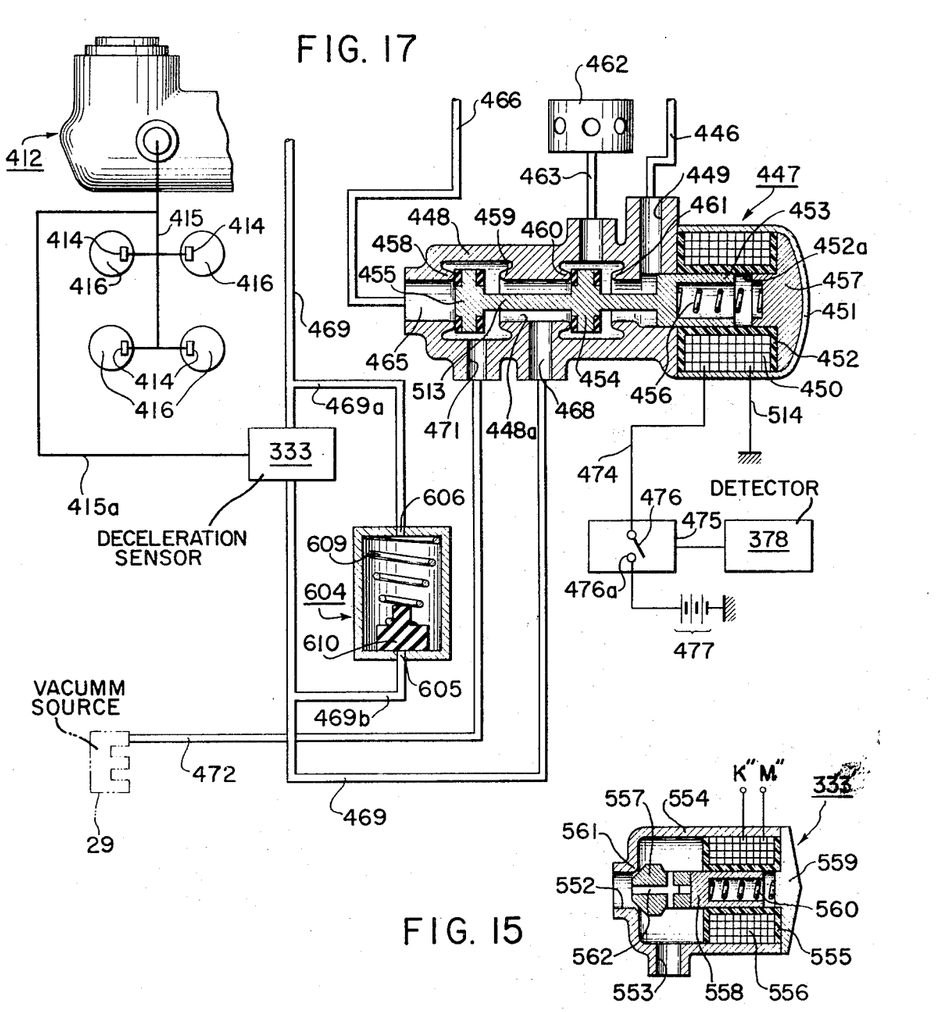
FIG. 15 is a longitudinal section of a throttle valve assembly employed in the fourth embodiment.
FIG. 17 is a schematic arrangement view of essential parts of a fifth embodiment of the invention wherein several mechanical constituents are shown in section.

It should be noted, that the upper half of FIG. 17 corresponding substantially to the upper part of FIG. 13 has been omitted from the drawing for avoiding complexity of same. In addition, same or similar constituents shown in FIG. 17 have been denoted with respective same reference shown in FIG. 13.

When the vehicle driver actuates the brake pedal to a sudden and considerable degree so that an electrical voltage output is applied as before to computer 475 for closing the switch arm 476 against its stationary contact 476a. In this way, solenoid 450 is energized and plunger 453 is urged to move rightwards in FIG. 17 against the action of spring 456. Vacuum valve 455 and air valve 454 made integral with said plunger are thereby brought into pressure engagement with respective valve seat 459 and 461 in a sealing manner. Thus, atmospheric pressure air is conveyed through air cleaner 462; valve passage now established between 454 and 460; port 468; piping 469; port 263 of sensor 333 (FIG. 6); orifice passage 273; pipings 469 and 415 and port 470 into left-hand chamber 427 of servo mechanism 413 (FIG. 13), yet only in a limited or partial way. In practice, substantial part of the air is conveyed through piping 469b to a port 605. In this way, check valve 610 is pneumatically opened against the action of its back-up spring 609 (FIG. 17). Then, the air is passed through the interior space of valve assembly 604; port 606 thereof; and pipings 469a and 469 into said chamber 427. At the same time, vacuum pressure is conveyed from its source 29 through piping 472; port 471; now established valve passage between 455 and 485; port 465; piping 466 and port 467 into the right-hand chamber 428 of servo mechanism 413 (FIG. 13). In this way, a completely reversed operation from the regular and conventional braking operation occurs. See, curve B'–C' in FIG. 8. The braking conditions arrives now at the point C', FIG. 8. At this stage, the signal fed from the side of the switch-computor assembly 475–6 is interrupted and thus solenoid 450 is brought into its de-energized position. Thus, the valve assembly 447 is returned to the relative position shown in FIG. 17. Then, vacuum pressure is introduced conversely into the left-hand servo chamber 427. The hitherto prevailing atmospheric air in this chamber 427 is sucked, upon forcingly opening of valve 264 of sensor 333, by the engine suction manifold. The valve opening period at 264 corresponds to the point C' in FIG. 8.

By the opening of valve 264, the atmospheric pressure hitherto prevailing in said chamber 427 is reduced and finally, the valve is brought into its closed position as shown in FIG. 6. This valve closure point corresponds to any one of the points D', F' and H' in FIG. 8. Then, atmospheric air prevailing in piping 463 is gradually sucked through port 263. This function corresponds any one of the later stage braking curves D'–E', F'–G' and H'–I', FIG. 8.

Other or further operation of this final embodiment will be easily understood from the foregoing disclosure of several foregoing embodiments, especially the third embodiment.

The embodiments of the invention in which as exclusive property or privilege is claimed are as follows:

1. An antiskid brake pressure control device for a hydraulic braking system for wheels of a powered vehicle, a hydraulic brake pressure control mechanism comprising a master cylinder, a wheel cylinder, a hydraulic circuit extending therebetween for allowing fluid communication between said cylinders, valve means provided in said hydraulic circuit and adapted for interrupting said fluid communication and a movable means for selective increase and decrease of the effective volume of part of said hydraulic circuit, sensor means for sensing the rotation of at least one of said wheels and delivering an instruction signal when the wheel is subjected to an excess braking beyond a predetermined deceleration of said wheel, a change-over valve operable to increase the effective volume of said hydraulic circuit part by actuating said movable means upon reception of said instruction signal delivered from said sensor, a detector for detecting maximum deceleration of the wheel under braking, a memory means for preservation of the detected maximum value of the wheel deceleration detected by said detector, first electric circuit means for converting said detected maximum wheel deceleration into a corresponding electric current, second electric circuit means for converting the rate of change of the effective volume of said hydraulic circuit into a corresponding electric current, a comparison means for comparing the output currents from said first and second electric circuit means, and an orifice valve for increasing the rate of effective volume reduction in said hydraulic circuit when the output current from said first electric circuit means is larger than that from said second electric circuit means and in response to the difference, and for decreasing said rate of effective volume reduction when the both output currents coincide in their values to each other.

2. An antiskid brake pressure control device for a hydraulic braking system for wheels of a powered vehicle, a hydraulic brake pressure control mechanism comprising a master cylinder, a wheel cylinder, a hydraulic circuit extending therebetween for allowing fluid communication between said cylinders, valve means provided in said hydraulic circuit and adapted for interrupting said fluid communication and a movable means for selective increase and decrease of the effective volume of part of said hydraulic circuit, sensor means for sensing the rotation of at least one of said wheels and delivering an instruction signal when the wheel is subjected to an excess braking beyond a predetermined deceleration of said wheel, a change-over valve operable to increase the effective volume of said hydraulic circuit part by actuating said movable means upon reception of said instruction signal delivered from said sensor, a detector for detecting maximum angular acceleration degree of the wheel under braking, memory means for preservation of the detected maximum value of the maximum wheel angular acceleration detected by said detector, first electric circuit means for converting said detected maximum wheel acceleration into a corresponding electric voltage, second electric circuit means for converting the rate of change of the effective volume of said hydraulic circuit into a corresponding electric voltage, a comparison means for comparing the output voltages form said first and second electric circuit means, and an orifice valve adapted for increasing the rate of effective volume reduction in said hydraulic circuit when the output voltage from said first electric circuit means is larger than that from said second electric circuit means and in response to the difference, and for decreasing said rate of effective volume reduction when the both output voltages coincide in their values to each other.

3. The control device as claimed in claim 2, wherein means are provided for making the rate of change of the effective volume of said hydraulic circuit variable in response to the maximum vehicle speed deceleration as sensed.

* * * * *